(12) United States Patent  
Baynard et al.

(10) Patent No.: US 7,978,345 B2  
(45) Date of Patent: Jul. 12, 2011

(54) GUIDANCE SYSTEM AND METHOD

(75) Inventors: Michael K. Baynard, Saint Petersburg, FL (US); Bernard H. White, Dallas, TX (US)

(73) Assignee: Scarab Technologies, L.L.C., Dallas, TX (US)

( * ) Notice: Subject to any disclaimer, the term of this patent is extended or adjusted under 35 U.S.C. 154(b) by 315 days.

(21) Appl. No.: 12/354,660

(22) Filed: Jan. 15, 2009

(65) Prior Publication Data

US 2009/0160628 A1 Jun. 25, 2009

Related U.S. Application Data

(63) Continuation-in-part of application No. 11/370,792, filed on Mar. 8, 2006, now abandoned, and a continuation-in-part of application No. 11/474,321, filed on Jun. 26, 2006, now abandoned.

(60) Provisional application No. 60/749,271, filed on Dec. 9, 2005.

(51) Int. Cl.
*G01B 11/14* (2006.01)

(52) U.S. Cl. ........................................ 356/614; 356/620
(58) Field of Classification Search .................. 356/614; 340/435–438, 932.2
See application file for complete search history.

(56) References Cited

U.S. PATENT DOCUMENTS

| | | | |
|---|---|---|---|
| 5,285,205 A | 2/1994 | White | |
| 6,163,253 A | 12/2000 | Yaron et al. | |
| 6,184,800 B1 | 2/2001 | Lewis | |
| 6,946,973 B1 | 9/2005 | Yanda | |
| 7,286,230 B1 | 10/2007 | Salmon | |
| 2003/0037718 A1* | 2/2003 | Randhawa | 116/28 R |

\* cited by examiner

*Primary Examiner* — Tarifur Chowdhury  
*Assistant Examiner* — Tara S Pajoohi  
(74) *Attorney, Agent, or Firm* — Slater & Matsil, L.L.P.

(57) ABSTRACT

The invention teaches using a directional light source to direct light at a target having directional indicia thereon. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

33 Claims, 6 Drawing Sheets

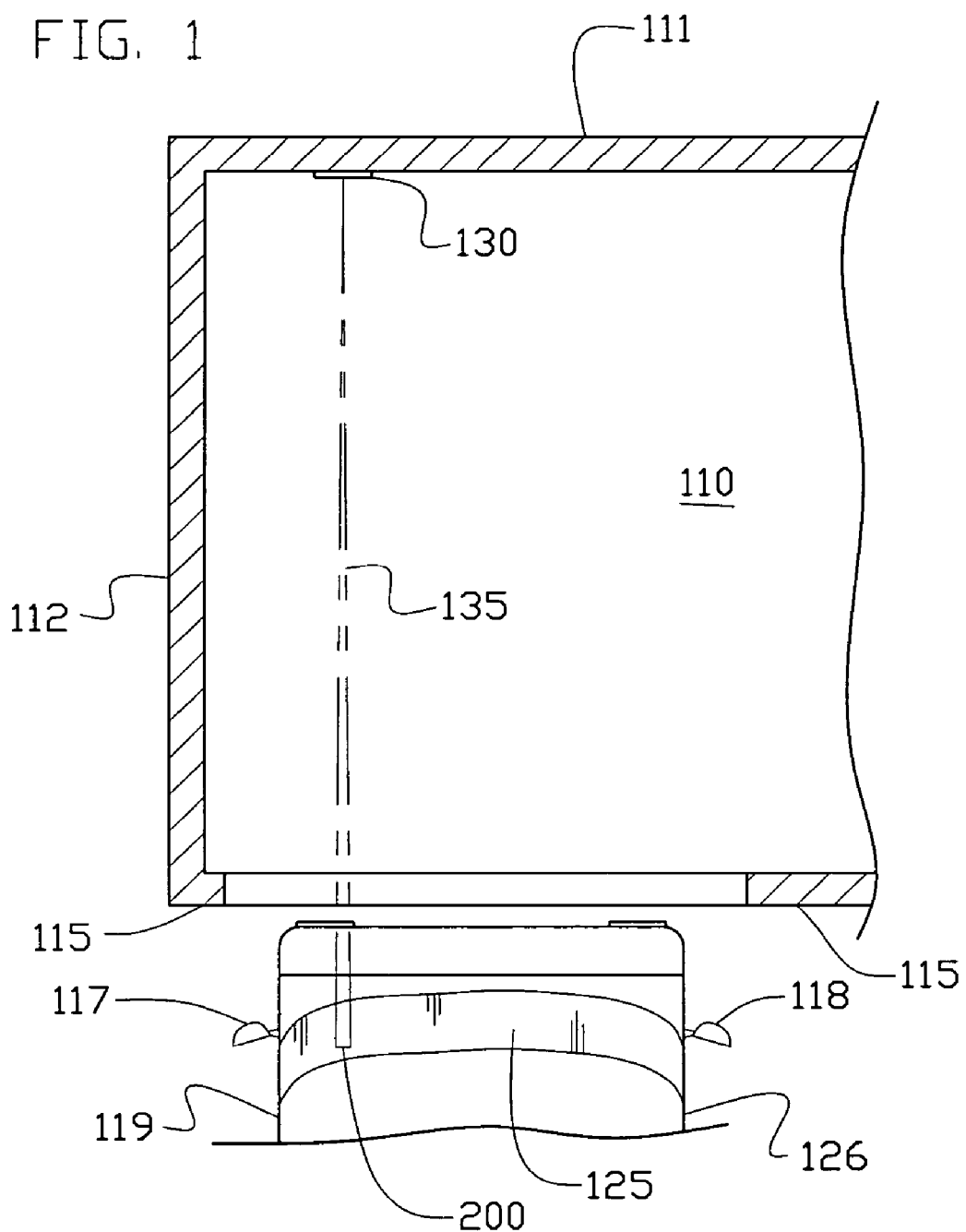

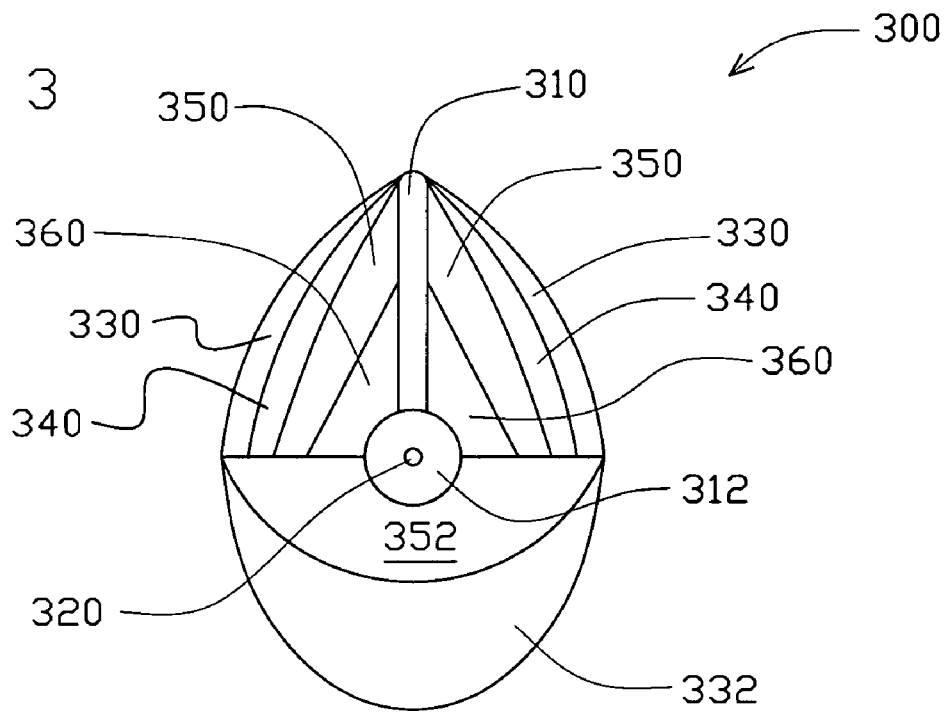
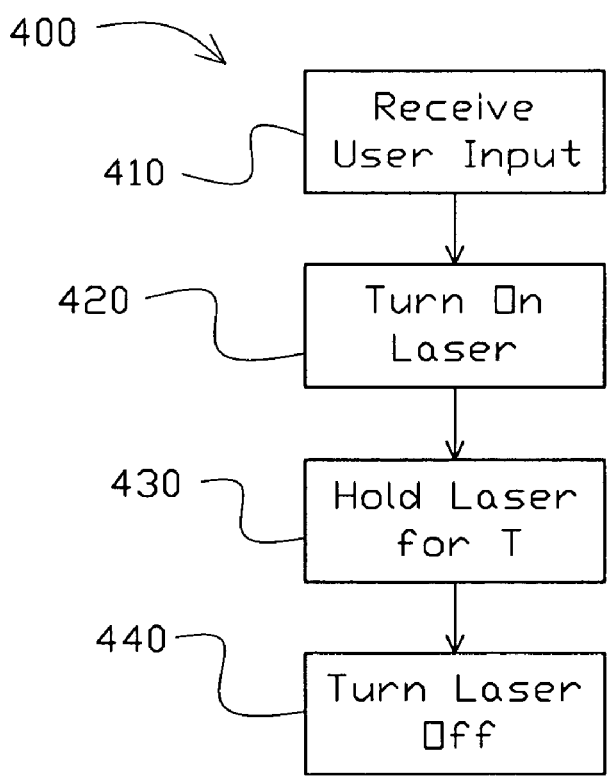

GUIDANCE SYSTEM AND METHOD

CROSS REFERENCE TO RELATED APPLICATIONS

This application is a continuation in part of U.S. patent application Ser. No. 11/370,792, entitled "Guidance System," filed on Mar. 8, 2006 now abandoned, and U.S. patent application Ser. No. 11/474,321, entitled "Guidance System," filed on Jun. 26, 2006 now abandoned, which claims priority to Provisional U.S. Patent Application No. 60/749,271 entitled "Guidance System," filed Dec. 9, 2005, by Baynard, et al. All three applications are incorporated herein by reference.

TECHNICAL FIELD

The invention relates generally to guidance systems.

BACKGROUND OF THE INVENTION

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

Quick and precise positioning of large items, such as shipping pallets, aircraft, shipping containers, boats, trucks, and automobiles, is desirable for both convenience and efficient commerce. Often, such as when a motor vehicle is parking or when a forklift is delivering a pallet, the operator/driver cannot completely view the item's position, and thus must make some guess as to where to stop, or how to position. At home, this leads to the all-too familiar holes in garage walls and scratches on car doors, while in commerce this leads to damaged goods or misplaced inventory, which means that less inventory can be stored in a given space. Accordingly, guidance systems have been developed to help users properly position a large item. However, none of the existing guidance systems reliably provide accurate, real-time position feedback to user in a package adaptable for implementation on a variety of platforms. The present invention solves these and other problems.

BRIEF DESCRIPTION OF THE DRAWINGS

Various aspects of the invention, as well as an embodiment, are better understood by reference to the following detailed description. To better understand the invention, the detailed description should be read in conjunction with the drawings, in which like numerals represent like elements unless otherwise stated.

FIG. 1 illustrates a motor vehicle using a guidance system to find a desired position within a garage.

FIG. 2 *b* is a schematic-block diagram;

FIG. 2 *c* illustrates a schematic diagram of an alternative embodiment of the present invention;

FIG. 3 shows an exemplary target;

FIG. 4 is a block-flow diagram of a laser operation algorithm; and

DETAILED DESCRIPTION OF ILLUSTRATIVE EMBODIMENTS

Figure 2A:
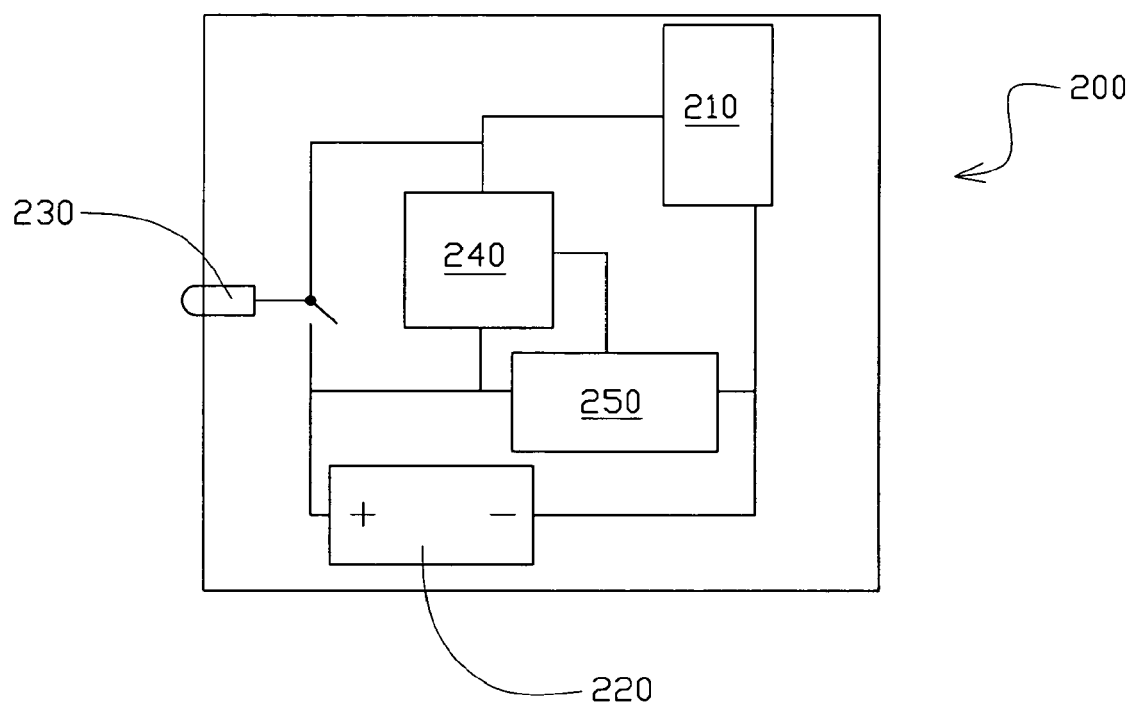
FIG. 2 *a* is a functional block-diagram.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for -functioning-" or "step for -functioning-" in the Claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise.

Of course, the foregoing discussions and definitions are provided for clarification purposes and are not limiting. Words and phrases are to be given their ordinary plain meaning unless indicated otherwise Specific Algorithms FIG. 1 illustrates a motor vehicle 126 using a guidance system to find a desired position within a parking space area 110. Providing guidance in a confined space protects assets, and gives even novice drivers the direction needed to guide a moving system over even large distances with great accuracy in a single pass. Accordingly, included within FIG. 1 is a guidance and positioning system, which generally comprises a directional light source 200, and a target 130 which preferably comprises a highly visible tracking strip that is visible over long distances. The light source 200 is capable of transmitting light in the visible light spectrum when in operation. The light source 200 is preferably mountable on a surface of a large item being positioned, such as a motor vehicle, where it is preferably articulatable through all degrees of freedom, including pitch, yaw, and roll, and can be calibrated to hold a position. The target 130 is preferably located on a generally vertical surface. The target 130 preferably has indicia of location thereon that provides real time visual feedback to an operator of the motor vehicle 126 of a position of the light source 200 relative to the target 130, such that when the light source 200 is in operation, the light transmitted from the light source 200 impinges the target 130. The target 130 is shown in greater detail in FIG. 3.

FIG. 1 provides additional invention context by also illustrating that the motor vehicle 126 has a windshield 125, a driver's side 119, a driver's side mirror 117 and a passenger's side mirror 118. Of course, such items are known to those of skill in the motor vehicle arts, and do not limit the invention in any way. In addition, the light source 200 is illustrated being coupled to the motor vehicle windshield 125. Although the light source 200 is shown coupled to the window 125, the invention is not so limited as the light source 200 may be coupled to any portion of any large item or any part of a motor vehicle interior or exterior, such as a visor, a rear view mirror, a dashboard, a side mirror, a headlamp, or a hood, for example. In FIG. 1 one may also see that the parking space area 110 is enclosed by a rear wall 111, a side wall 112, and wall portions 115 on either side of an opening through which the motor vehicle 126 may pass, and through which a light beam 135 passes on its way from the light source 200 and the target 130. Of course, garages and motor vehicles have much more detail known to those of skill in the art.

FIG. 2a is a functional block-diagram showing further detail of the light source 200 and conceptual functionality of the invention. This light source is powered by a power supply 220, which is preferably a battery, such as an alkaline watch battery, a nickel-cadmium battery, lithium battery (or derivatives thereof), or a standard alkaline battery, for example. However, alternative methods of power supply, such as solar power, are known, and incorporated within the scope of the invention. The power supply 220 runs power to a light generator 210, which is preferably a solid-state laser.

To complete the circuit between the light generator 210 and the power supply 220, a switch must be closed. Accordingly, one user-activated switch 230 is placed in parallel with a solid-state transceiver switch 240 so that if either switch is closed, current will flow to the light generator 210 and directional light will be produced. Accordingly, the user-activated switch 230 is preferably activated by a user-touch, but could also be activated by another user activity, such as activating a garage door opener, for example. Similarly, the transceiver switch 240 closes when the transceiver 240 detects a proximity signal generated by a matched transmitter or transceiver (discussed in more detail below). Electronic receiver, transceivers, transmitters, and switches are readily known to those of ordinary skill in the electronic arts.

Of course, it is undesirable to produce light continuously as this would run-down the power supply 220. Accordingly, a solid state logic/intelligence 250 is provided. The logic/intelligence 250 preferably includes a timing system so that the circuit will be closed for only a predetermined amount of time (unless in a "calibration mode", as discussed below), and systems for detecting which of the switches 230, 240 is carrying current. Accordingly, when the logic/intelligence 250 detects that current is flowing through a switch 230, 240, the logic/intelligence 250 starts the timer so that the active switch may be opened (sometimes called "reset") a predetermined amount of time later. In one embodiment, the amount of time a switch 230, 240 is active may be user-selected. Logic/intelligence is also known to those of ordinary skill in the electronic arts, and could include members of the digital signal processor (DSP) family from Texas Instruments®, a Microchip PIC micro-controller, and/or equivalents. In any event, it is stressed that the implementation of the controller is very flexible in part due to its embedded programming logic and an open architecture.

Figure 2B:
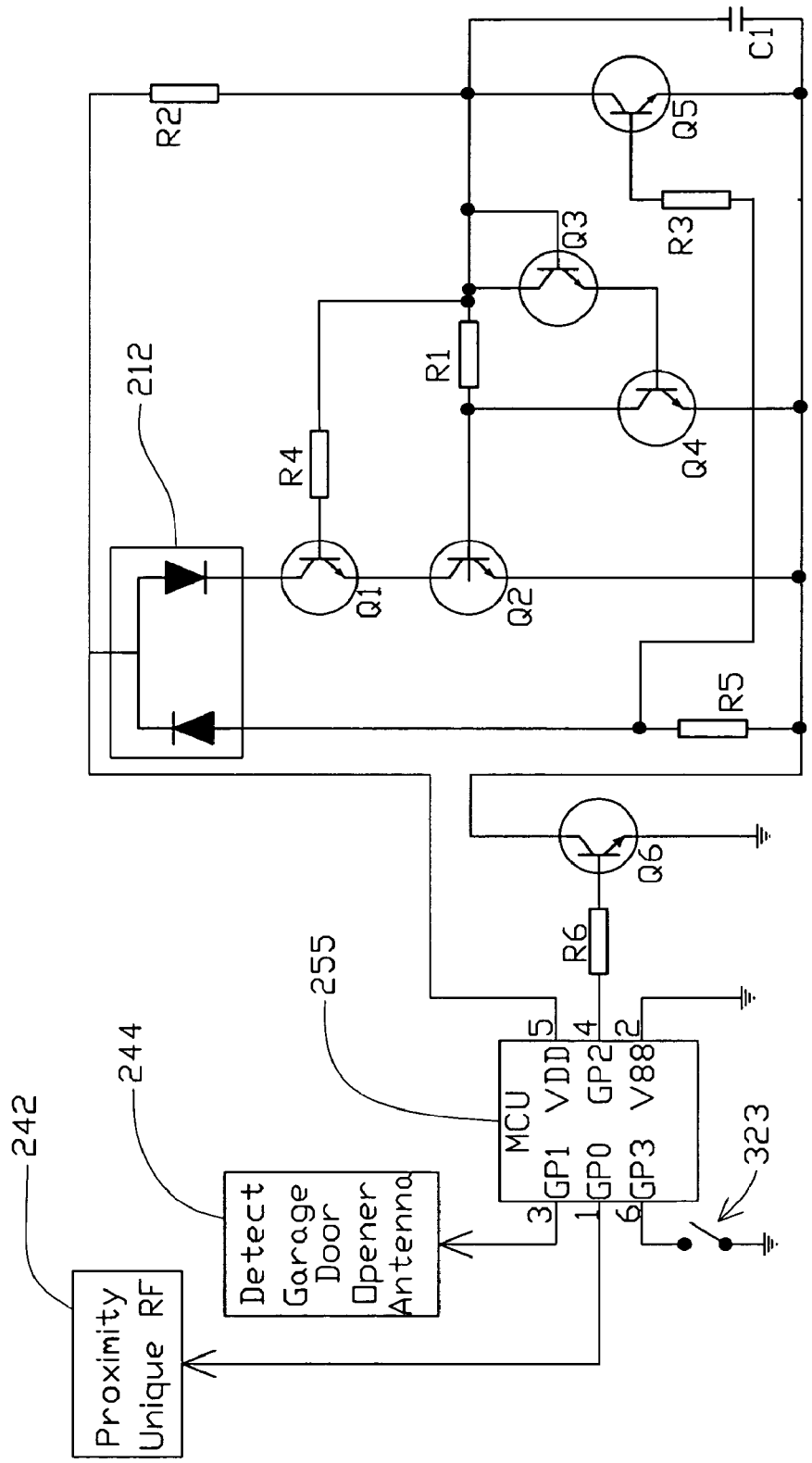

FIG. 2b is a schematic-block diagram showing even further detail of a light source. Although like numbering between FIG. 2a and FIG. 2b represent like parts, it should be understood that like numbering between the figures does not require that a referenced part in FIG. 2a be exactly the same as a referenced part in FIG. 2b. Here, the light source includes a master control unit (MCU) 255 that stays in a sleep mode until awakened by an interrupt, and then powers on a laser. The MCU 255 may be awakened by a proximity detector, such as a radio frequency (RF) detector 242 that detects a unique radio frequency, a user-activated switch 323, or a garage door opener remote control 244. Of course, proximity detectors may be RF, infrared, or other detectors known in the arts. Each of the detector 242, the switch 323, and the garage door opener 244 are coupled to the MCU 255 as is known in the art. In addition to using RF devices, the proximity device 242 may also be infrared such that each of the detector 242, switch 323, and opener 244 activate the MCU 255 only when the proximity device receives the appropriate infrared signal (this provides line-of-sight activation (and awakening)). Alternatively, if the switch 323 is held down long enough, the switch both awakens the MCU 255 and activates the laser 212.

FIG. 2b also illustrates electronic details (circuit) for implementing the invention. Pin-input V88 of the MCU 255 is connected to ground, VDD of the MCU 255 provides a first "high" voltage to the circuit, while GP2 couples to the low-voltage rail of the light generator circuit, which includes those resistors R1-R6, transistors Q1-Q6, capacitor C1, and laser-diode pair 212 (which could be embodied as any laser type known in the laser and/or electronic arts). Of course, a low-power MCU that takes advantage of sleep and wake states, as is known in the electronic arts, may be used. Furthermore, the MCU 255 may be programmable so that it may read and validate multiple wavelength sources in close proximity with each other, without interference or false positives/negatives.

Figure 2C:
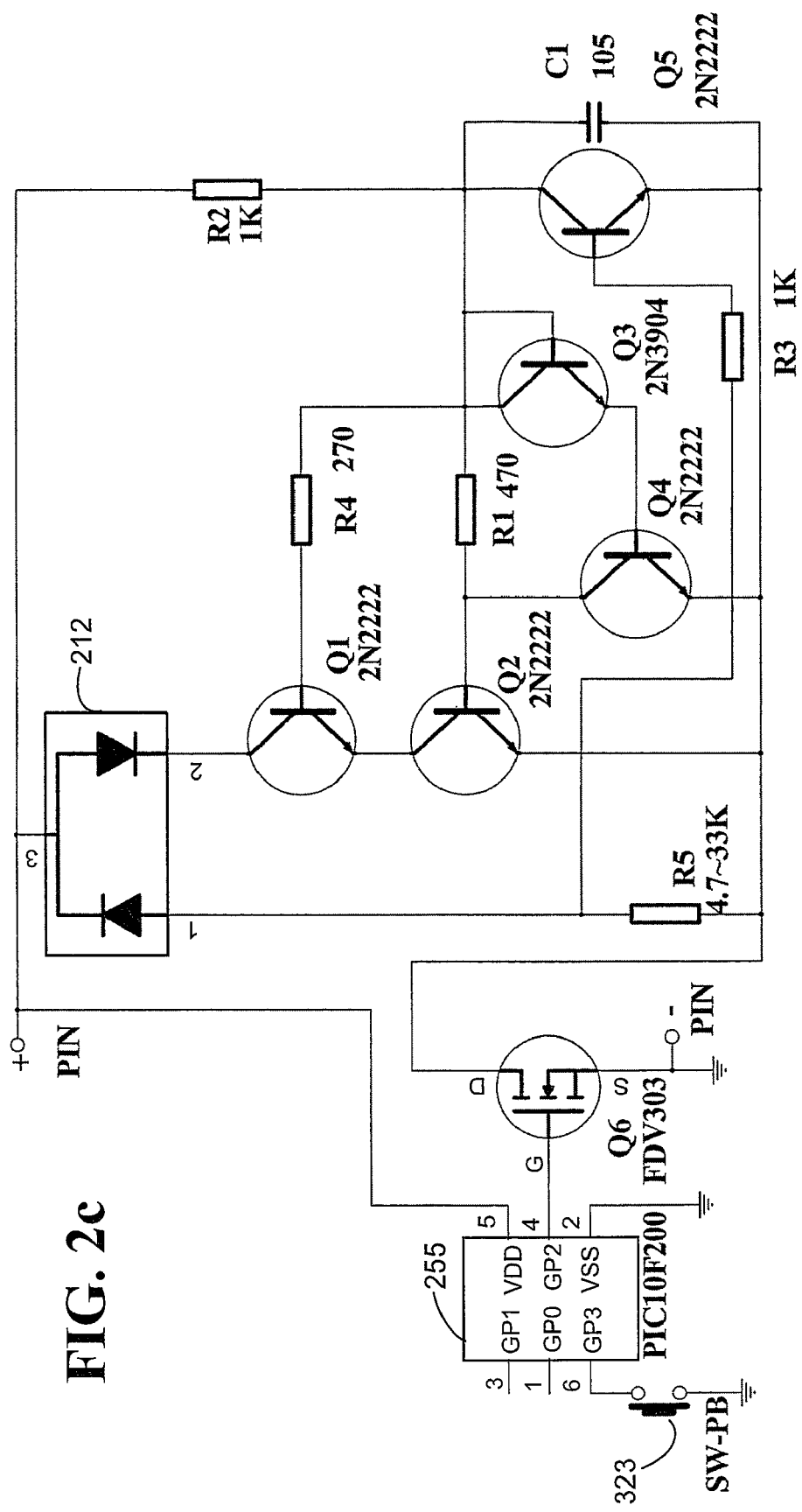

FIG. 2c illustrates a circuit schematic according to an alternative embodiment of the present invention. In this alternative embodiment, NPN transistors Q1, Q2, Q4 and Q5 are implemented as 2N2222 transistors, Q3 is implemented as a 2N3904 transistor and Q6 is implemented as a MOSFET. The value of R1 is about 470Ω, R2 and R3 are about 1KΩ, R4 is about 270Ω, and R5 is between about 4.7 and 33KΩ.

FIG. 3 shows an exemplary target 300. Preferably, the target 300 comprises a position indicator 320 which in one embodiment functions as a bulls-eye that illuminates or "appears to illuminate" (hereinafter, "illuminates") when reflecting directional light, such as a red laser or a green laser (this may also be described as a laser "impinging" a surface point or area). Herein, illuminates means that the visual feedback of an area, to a person with normal vision viewing the target, creates the appearance that the area is illuminating, or throwing off light in such as way that it may be confused with a light source—at least as much as any traditional reflector. In one embodiment an LED is lit or a buzzer sounds when the position indicator is illuminated. In addition, the position indicator 320 may, in alternative embodiments, comprise a transmitter (or transceiver) that either periodically transmits a signal, or which transmits a signal based upon some predetermined event, such as the opening of a garage door, or the crossing of a boundary (such as the breaking of some light-source or laser beam). Of course, although the transmitter is shown in FIG. 3 as being co-located with the position indicator 320, this is not a required location for the transmitter. For example, the transmitter may be located off the target completely, outside a garage, or anywhere within or near the desired destination location. In one embodiment, the target 300 is mounted upon an interior wall of a garage. In an alternative embodiment the target is mounted on a horizontal surface such as a ceiling or flooring.

The target should be coated with a reflective material such as microprisms or light pipes, and/or each section of the target should also comprise materials (again, such as microprisms or light pipes) having reflective properties. Exemplary materials include vinyl, glass beads, mirocprismatic materials, and equivalents. Additionally, distinctive marks may be located upon the target to provide additional real-time feedback to a user.

In an alternative embodiment, the target 300 comprises a path area 310 such as the shown centering path that is generally vertically positioned from a top portion of the target 300 to an area of the target proximate to the position indicator 320. In FIG. 3, this area is represented by the enlarged bulls-eye area 312 that "illuminates" with a background color that is different from the color of the bulls-eye 320. Preferably, the centering path 310 illuminates in a manner similar to the bulls-eye area 312.

In addition, a first horizontal position warning indicator area 330 located on at least one side of the centering path 310, which in FIG. 3 is shown on both sides of the centering path area 310, and preferably illuminates in a third manner when reflecting a directional light (note that horizontal position warning indicators have a generally vertical orientation, and are designed to show a horizontal position of a light source relative to the centering path 310). Furthermore, the target 300 may comprise a second horizontal position indicator area 340 located on at least one side of the first horizontal position warning indicator. Again, in FIG. 3, the second horizontal position indicator area 340 is located on both sides of the centering path 310, and the second horizontal position indicator area 340 is visually different from the first horizontal position indicator area. For example, the second horizontal position indicator area 340 could illuminate in a fourth manner when reflecting directional light. Thus, similarly, a third horizontal position indicator areas 350 may be provided, which preferably illuminates in a fifth manner when reflecting directional light, while a fourth horizontal position indicator areas 360 may be provided, which preferably illuminates in a sixth manner when reflecting directional light.

The target 300 further comprises a proximity position warning indicator area 352 located at least below the position indicator 320, the proximity position warning indicator area 352 being visually different from the position indicator 320. For example, the proximity position warning indicator area 352 preferably reflects distinctively. In an alternative embodiment, the proximity position warning indicator area 352 and the first horizontal position warning indicator area 330 generally have the same visual appearance when reflecting a directed light. Optionally, a second proximity warning indicator area 332 may be provided to provide a critical proximity situation, which would indicate that the light source is much too close to the target 300. The second proximity warning indicator area 332 is typically located below the first proximity warning indicator area 352, and preferably illuminates differently from all other areas of the target 300.

Of course, a great many varieties of directional targets are available and are included within the scope of the invention. In addition, many approaches exist for differentiating different areas of reflection, such as differing intensities of reflection, different patterns (such as lines, pixeling, or the like), different colors, and the like.

Methodology
General Methodology

The invention may be generalized as a method of guiding a large item, such as a motor vehicle including automobiles, aircraft, boats, motorcycles, forklifts, trucks, containers, forklifts, and equivalents known and unknown, foreseeable and unforeseeable. One method of guiding a motor vehicle 300 generally comprises receiving a beacon signal at a light source, where the beacon signal is interpreted as an instruction to turn on the light source. A proximity beacon preferably broadcasts a signal inside a garage that is also receivable along a driveway, thus enabling the laser to be activated in proximity (or eyesight) of the garage.

Here, the light source is stationary relative to the motor vehicle. First, the light source turns on so that a light beam in the visible spectrum may reflect off of a reflective target. Thus, when a motor vehicle is in a first position, the light beam reflects upon a first location on the reflective target (the reflective target is stationary, vertical, and has a position indicator thereon).

Then, as the user of the motor vehicle moves in response to the location of the light source on the target (presumably in response to where they see the light source being reflected), the user of the motor vehicle moves the motor vehicle to a second position. If operated properly, the reflected location of the light source in the second position is closer to the specific position indicator than the reflected location of the light source when the motor vehicle is in the first position. The method preferably produces the light source for a predetermined time, T when in the presence of the beacon. Alternatively, the instruction to turn on the light source may be a manual push of a switch.

In an alternative embodiment, the instruction to turn on the light source is defined as a secondary instruction. A primary instruction is defined as an instruction generated by a device or activity not directly associated with guidance. Accordingly, a secondary instruction is defined in general as any instruction in a two-or-more-set-of-instructions as any instruction other than an instruction to turn on a light source, and specifically as an instruction generated by a device or activity not directly with guidance. For example, the primary instruction could be the opening of a garage door by activating a garage door opener (or any remote-control activated door through which may pass any large item). Another example of a primary instruction could be a manual push of a switch. In either example, a secondary instruction could be activation of the proximity transceiver, that would put the unit in an awakened state ready to receive the primary instruction. In this example, power is preferably sent to the light source upon receiving both interrupts of a valid primary and secondary instruction.

Additionally, the invention may provide a visual or audible warning if the light source is within a predetermined distance of a stationary transceiver (this could be implemented by enabling the light source to emit an RF signal). Likewise, the laser may be configured to be inoperable when it does not receive a signal from the stationary transceiver.

By providing a transceiver proximate to the target (in addition to or instead of a transmitter), additional functionality is possible. For example, a "stop" light may be turned on near or on the target when a transceiver (or transmitter) is detected to be closer than a predefined safe distance. Alternatively, a buzzer, bell or other sound may be made to indicate the same condition. Similarly, the method includes sounding a warning if the light source is within a predetermined distance of a stationary transceiver. However, additional or alternative transmitters, receivers, or transceivers are not required if such feedback is incorporated within the light source. In other words, for example, if a "stop" light, or buzzer is incorporated with the light source so as to warn the user that they are within a predefined distance of the transmitter, then only a simple (and less expensive) receiver-transmitter is needed to implement the additional features, rather than a dual-transceiver system.

Specific Algorithms

FIG. 4 is a block-flow diagram of a laser operation algorithm 400. The laser operation algorithm begins with a receive user input act 410 in which a user either directly activates a switch, or performs some other action that initiates the laser operation algorithm 400. Preferably the MCU is in a low-power state (idle), until the MCU receives a validated interrupt, such as a push of a button that closes a switch to power a light source.

Next, the laser operation algorithm 400 proceeds to turn on a directional light source, which is preferably a laser, in a turn on laser act 420. Following the turn on laser act 420, the directional light source is kept active for a predetermined period of time, T, in a hold laser for T act 430. Then, the directional light source is turned off in a turn off laser act 440. Of course, the laser may also be turned off by the user, such as via a second touch. In an alternative embodiment, the light source is active for a time T after the directional light source loses contact with a transmitter. Sometimes, it is desirable to require the user to press the button (or perform some other action) for an extended period of time, including receiving a user interrupt for a predetermined period of time, such as two or three seconds. In situations such as target calibration, the light source may stay on for an extended period of time, perhaps until the button is pressed again (T is indefinite).

Figure 5:
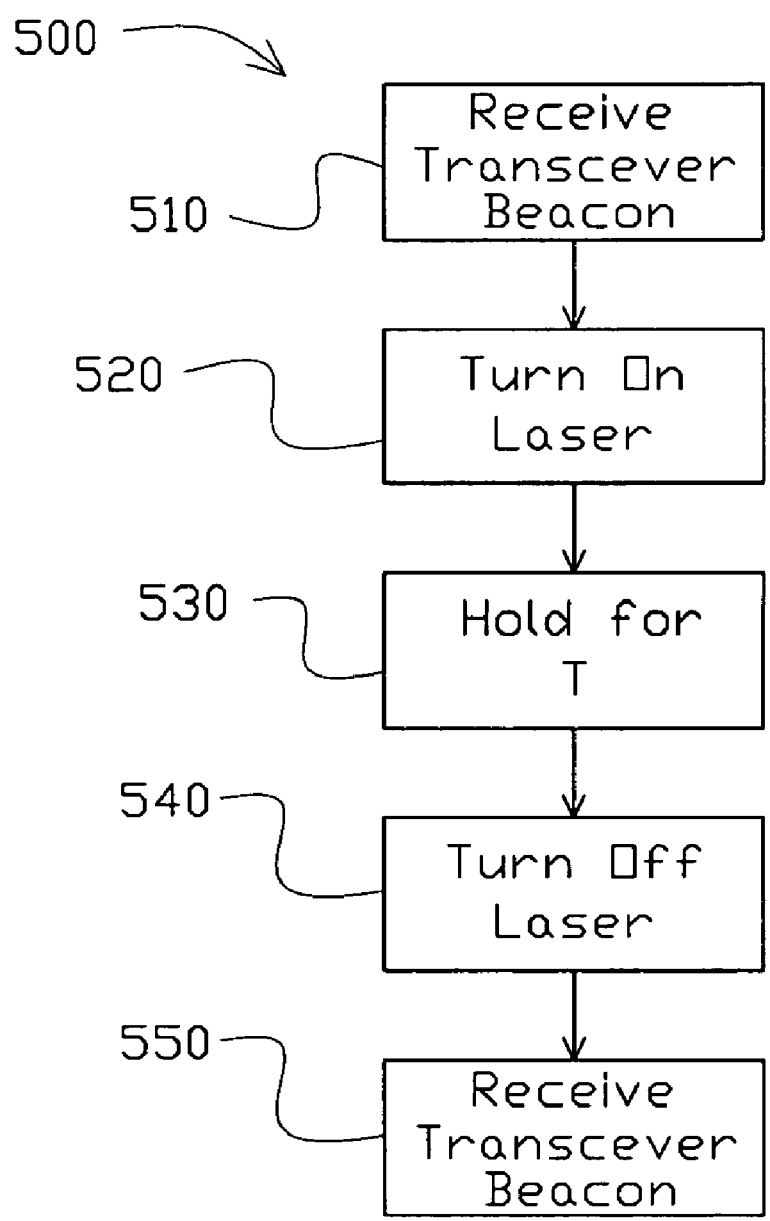
FIG. 5 is a block flow diagram of an automated laser algorithm.

FIG. 5 is a block flow diagram of a proximity laser algorithm (the proximity algorithm) 500 which may incorporate any of the features of the laser operation algorithm 400. The proximity algorithm 500 begins with a receive beacon act 510, where either the receiver of the light source or the MCU detects a transmitted signal (from the transmitter located proximate to the target). Then, in response to detecting the transmitted signal, the proximity algorithm 500 wakes up the light source in a turn on laser act 520. In a preferred embodiment this occurs when the MCU receives a first signal that is interpreted as a "wake up" and then a second signal that turns on the light source laser. Next, in a hold for time T act 530, the proximity algorithm 500 maintains the light source for the duration of time that the receiver detects the transmitted signal, or for a time T (a time-out condition), preferably for whichever is shorter duration, at which time the light source is terminated in a turn off laser act 540. In the event that the proximity algorithm 500 terminated due to a time-out condition, and remains in the presence of the beacon, then the light source is still held in an off state in a maintain state act 550 until the system is reset by the manual switch being engaged, or by some equivalent predetermined action.

Though the invention has been described with respect to a specific preferred embodiment, many variations and modifications (including equivalents) will become apparent to those skilled in the art upon reading the present application. It is therefore the intention that the appended claims and their equivalents be interpreted as broadly as possible in view of the prior art to include all such variations and modifications.

What is claimed is:

1. A guidance and positioning system, comprising:
 a directional light source configured to be mounted on a motor vehicle; and
 a target configured to reflect the directional light source and configured to be mounted on a vertical surface with respect to a direction of motion of the motor vehicle, the target comprising
  a centering path area being generally vertically positioned from a top portion of the target toward a plane of motion of the motor vehicle, to an area of the target proximate to a position indicator, the top portion of the target area being further from a plane of motion of the motor vehicle than the position indicator, and
  a first horizontal position warning indicator area located on at least one side of the centering path, the first horizontal warning indicator area comprising a visually distinct and separate area from the centering path and positioned horizontally with respect to the centering path.

2. The system of claim 1, wherein the directional light source comprises a laser.

3. The system of claim 1, further comprising:
 a transmitter; and
 a receiver coupled to the directional light source, the receiver configured to place the directional light source in a ready state upon reception of a signal from the transmitter.

4. The system of claim 3, wherein the receiver comprises a controller, the controller configured to:
 place the directional light source in the ready state; and
 turn on the directional light source upon receipt of a second signal when the directional light source is in the ready state.

5. The system of claim 4, further comprising a user-activated switch providing the second signal to the controller, the user activated switch providing the second signal, wherein the user activated switch turns on the directional light source when the directional light source is in the ready state.

6. The system of claim 4, wherein the receiver is further configured to provide the second signal to the controller upon receipt and validation of an RF signal associated with a garage door remote, wherein the directional light source is turned on upon receipt and validation of an RF signal associated with a garage door remote when the directional light source in the ready state.

7. The system of claim 1, the target further comprising a second horizontal position indicator area located on at least one side of the first horizontal position warning indicator, the second horizontal position indicator area being visually different from the first horizontal position indicator area.

8. The system of claim 1, the target further comprising a proximity position warning indicator area located at least below the position indicator, the proximity position warning indicator area being visually different from the position indicator.

9. The system of claim 8, wherein the proximity position warning indicator area and the first horizontal position warning indicator area generally have a same visual appearance when reflecting directed light.

10. The system of claim 1, wherein the directional light source is configured to be mounted at an adjustable angle.

11. The system of claim 1, wherein the directional light source is configured to shut-off after a predetermined period of time.

12. The system of claim 1, wherein the target is configured to provide real-time visual feedback to an operator of the motor vehicle.

13. The system of claim 1, wherein the centering path area comprises a contiguous vertical strip.

14. The system of claim 1, wherein the target further comprises a plurality of further horizontal indicators disposed on two sides of the centering path.

15. The system of claim 14, wherein the plurality of further horizontal off-center indicator areas have a generally vertical orientation.

16. The system of claim 1, wherein the first horizontal position warning indicator comprises reflective material.

17. The system of claim 1, wherein the target further comprises a position indicator vertically disposed beneath the centering path area.

18. A method of guiding a motor vehicle, comprising:
   activating a directional light source mounted on the motor vehicle; and
   receiving a light beam upon a first location of a reflective stationary target, the target having a reflective centering area disposed beneath a plurality of reflective vertical and horizontal off-center indicator areas, the plurality of reflective vertical and horizontal off-center indicator areas visually distinct and separate from the reflective centering area, the stationary target and the directional light source configured to allow altering a position of the motor vehicle responsive to light reflected at the first location of the reflective stationary target such that the motor vehicle is moved so that light is reflected at a second location of the reflective stationary target, the second location of the reflective stationary target being closer to the reflective centering area than the first location of the reflective stationary target in both a vertical direction with respect to a direction of motion of the motor vehicle, and a horizontal direction perpendicular to the vertical direction and in a plane of the target.

19. The method of claim 18, wherein activating the directional light source comprises turning on the directional light source for a predetermined time.

20. The method of claim 18, wherein activating the directional light source comprises turning on the directional light source in response to a signal received from a stationary transmitter.

21. The method of claim 18, wherein the light source comprises a laser.

22. The method of claim 18, wherein activating the directional light source comprises receiving a secondary instruction associated with a primary instruction.

23. The method of claim 18, wherein the motor vehicle comprises an automobile.

24. The method of claim 18, wherein the reflective stationary target is mounted upon an interior wall of a garage.

25. The method of claim 18, further comprising sounding an audible warning if the light source is within a predetermined distance of a stationary receiver.

26. The method of claim 18, further comprising providing a visual warning if the light source is within a predetermined distance of a stationary receiver.

27. The method of claim 18, wherein the motor vehicle comprises an airplane.

28. The method of claim 18, wherein activating the directional light source further comprises:
   placing the directional light source in a ready state upon receipt of a signal from a stationary transmitter; and
   turning on the directional light source upon receipt of a secondary instruction after placing the directional light source in the ready state.

29. The method of claim 18, wherein the reflective stationary target further comprises a reflective centering path area disposed above the reflective centering area.

30. The method of claim 29, wherein the reflective centering path area comprises a contiguous vertical strip.

31. The method of claim 18, wherein the plurality of further horizontal off-center indicator areas have a generally vertical orientation.

32. A system for parking an automobile, the system comprising:
   a directional light source comprising a laser, the directional light source configured to be mounted on an automobile at an adjustable angle;
   a stationary target configured to be mounted on a vertical surface with respect to a direction of motion of the automobile, the target comprising
      a centering path area being generally vertically positioned from a top portion of the target toward a plane of motion of the automobile, to an area of the target proximate to a position indicator, the top portion of the target area being further from a plane of motion of the automobile than the position indicator, and
      a first horizontal position warning indicator area located on at least one side of the centering path, the first horizontal warning indicator area comprising a visually distinct and separate area from the centering path and positioned horizontally with respect to the centering path, wherein the stationary target comprises reflective material; and
   a receiver coupled to the directional light source, the receiver configured to activate the directional light source on reception of a remote activation signal, wherein the directional light source is configured to shut-off at a predetermined period of time after the directional light source is activated.

33. The system of claim 32, wherein the centering path area comprises a contiguous vertical strip.

* * * * *